United States Patent
Berg et al.

(10) Patent No.: US 10,171,370 B1
(45) Date of Patent: Jan. 1, 2019

(54) DISTRIBUTION OPERATING SYSTEM

(71) Applicant: Amazon Technologies, Inc., Seattle, WA (US)

(72) Inventors: Paul William Berg, Seattle, WA (US); Marc John Brooker, Seattle, WA (US); Aravindhan Vijayaraghavan, Tamil Nadu (IN); Jayaram Mulupuru, Sammamish, WA (US); Josh Zell Curry, Seattle, WA (US); Christopher Ted Fischer, Seattle, WA (US); Benjamin Christian Blount, Seattle, WA (US); Anthony John Dillon, Bracknell (GB); Christopher Allen Suver, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 735 days.

(21) Appl. No.: 14/292,572

(22) Filed: May 30, 2014

(51) Int. Cl.
*G06F 15/16* (2006.01)
*H04L 12/911* (2013.01)
*H04L 29/08* (2006.01)

(52) U.S. Cl.
CPC .............. *H04L 47/70* (2013.01); *H04L 67/10* (2013.01)

(58) Field of Classification Search
CPC . G06F 8/61; G06F 9/5072; G06F 9/54; G06F 9/547; G06F 21/72; G06F 9/4843; G06F 9/541; H04L 67/04; H04L 67/10; H04L 47/70

USPC .......... 455/422.1; 717/177; 726/4; 709/226, 709/232, 201
See application file for complete search history.

(56) References Cited

U.S. PATENT DOCUMENTS

| | | | | |
|---|---|---|---|---|
| 5,926,636 A | * | 7/1999 | Lam | G06F 9/547 709/232 |
| 6,377,994 B1 | * | 4/2002 | Ault | H04L 63/10 707/999.009 |
| 6,662,356 B1 | * | 12/2003 | Edwards | G06F 9/54 717/113 |
| 6,769,122 B1 | * | 7/2004 | Daudel | G06F 9/3851 712/E9.053 |
| 6,938,021 B2 | * | 8/2005 | Shear | G06Q 20/3674 705/67 |
| 7,143,066 B2 | * | 11/2006 | Shear | G06Q 20/3674 705/54 |
| 8,417,992 B2 | * | 4/2013 | Stakutis | G06F 11/1417 713/2 |
| 8,544,004 B2 | * | 9/2013 | Fultheim | G06F 9/45533 718/1 |
| 9,703,582 B1 | * | 7/2017 | Chigurapati | G06F 9/45533 |
| 2001/0034711 A1 | * | 10/2001 | Tashenberg | G06F 9/4843 705/52 |
| 2002/0026592 A1 | * | 2/2002 | Gavrila | G06F 21/6218 726/6 |
| 2003/0009600 A1 | * | 1/2003 | Koyama | G06F 9/50 719/310 |

(Continued)

*Primary Examiner* — Imad Hussain
(74) *Attorney, Agent, or Firm* — Thorpe North & Western, LLP

(57) ABSTRACT

Technology for a distribution operating system is provided. In one example, a method may include executing a distribution operating system on a host operating system on a local computing device and executing an application within the distribution operating system using networked computing resources managed by the distribution operating system.

20 Claims, 7 Drawing Sheets

(56) References Cited

U.S. PATENT DOCUMENTS

| | | | |
|---|---|---|---|
| 2004/0100982 A1* | 5/2004 | Balasubramanian | ............... G05B 19/0421 370/429 |
| 2007/0223483 A1* | 9/2007 | Huang | .................... H04L 47/10 370/394 |
| 2008/0098392 A1* | 4/2008 | Wipfel | .................... G06F 9/468 718/1 |
| 2008/0222160 A1* | 9/2008 | MacDonald | .............. G06F 8/61 |
| 2010/0161976 A1* | 6/2010 | Bacher | .................... G06F 9/541 713/164 |
| 2010/0161978 A1* | 6/2010 | Bacher | ................. G06F 9/5055 713/166 |
| 2010/0279678 A1* | 11/2010 | Li | ...................... H04L 67/2823 455/422.1 |
| 2011/0125894 A1* | 5/2011 | Anderson | ............ H04L 9/3213 709/224 |
| 2012/0036552 A1* | 2/2012 | Dare | ................... H04L 41/0253 726/1 |
| 2012/0266162 A1* | 10/2012 | Baron | ................. G06F 9/45558 718/1 |
| 2012/0272238 A1* | 10/2012 | Baron | ............... G06F 17/30238 718/1 |
| 2013/0054528 A1* | 2/2013 | Saika | .................... G06F 3/0608 707/638 |
| 2013/0132531 A1* | 5/2013 | Koponen | ............ H04L 41/0823 709/220 |
| 2013/0260832 A1* | 10/2013 | Park | ..................... H04B 1/3816 455/558 |
| 2013/0262405 A1* | 10/2013 | Kadatch | ................ G06F 9/5072 707/692 |
| 2013/0318571 A1* | 11/2013 | Radzikowski | .......... G06F 21/45 726/4 |
| 2014/0137102 A1* | 5/2014 | Chan | ................. G06F 17/30085 717/177 |
| 2014/0289411 A1* | 9/2014 | Bornstein | ................ G06F 9/54 709/226 |
| 2015/0242655 A1* | 8/2015 | Haider | ................. H04L 9/0894 726/34 |

* cited by examiner

DISTRIBUTION OPERATING SYSTEM

BACKGROUND

Applications and services are often made available over the Internet or other computer networks. Content providers, application providers, and/or service providers often utilize remote computing services to providing access to electronic resources, such as web services. Electronic resources may include processors, memory, storage, networking and, generally, any hardware used in a computing environment. Often hardware and/or software used to support desired services is dynamically scalable to meet the needs of the services at any given time. Users, for example, may rent, lease, or otherwise pay for access to networked computing resources, and thus reduce the burden of providing local hardware and/or software for computing services, as compared with implementations without remote computing services.

Historically, users of computing resources have often utilized local computing resources, that is, resources locally managed on or in connection with user devices, such as notebooks and/or desktop computers or a local network. Common applications, such as word processing applications, for example, often execute locally on a user's computer, such as a work or home computer. As such, users (or organizations associated with the users) often pay for expensive hardware for executing the applications as well as for the maintenance and upgrades of the hardware.

DETAILED DESCRIPTION

Technology for a distribution operating system is provided that manages distributed hardware that is accessible via a computer network. In one example, a method may include executing a distribution operating system on a host operating system on a local computing device and executing an application within the distribution operating system using networked computing resources managed by the distribution operating system. In other words, a kernel of the distribution operating system may operate on a host operating system using local computing resources managed by the host operating system while applications execute on the distribution operating system but use remote or networked computing resources that are managed by the distribution operating system. The networked computing resources may be computing services accessed via a computer network or hardware resources that are accessible via the computer network.

In a more specific example, a method for implementing a distribution operating system may include executing a distribution operating system as an operating system application on a host operating system on a local computing device, the distribution operating system including a kernel. The computing resources from the local computing device may be used to execute the kernel of the distribution operating system on the local computing device. An application may be executed within the distribution operating system using networked computing resources, as instructed by the kernel of the distribution operating system. The distribution operating system may issue at least one distribution agent to the networked computing resources to facilitate execution of the application using the networked computing resources. The distribution agent(s) may receive portions of the application for execution, may receive instructions and/or data to process at the networked computing resources, and/or receive instructions and/or data from the networked computing resources to be sent to the application at the local computing device. For example, a portion of the application's executable image may be sent to the networked computing resources for execution, where the networked computing resources are provided through a service provider environment. Similarly, data and instructions for the application may be sent across a network to the service provider environment. The networked computing resources may include, for example, compute, storage, networking and other computing resources.

Figure 1A:
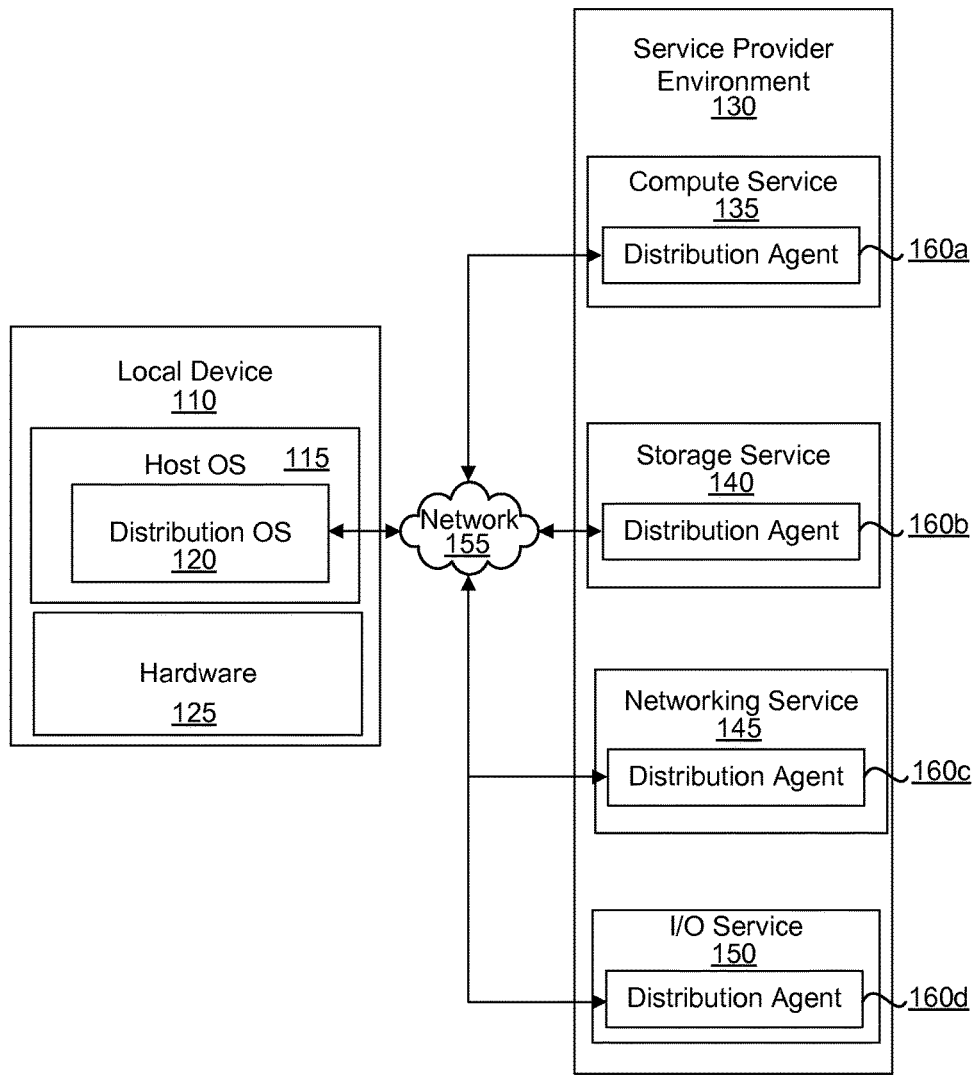
FIGS. 1A-1B are block diagrams of implementations of distribution operating systems in accordance with examples of the present technology.

FIG. 1A illustrates a block diagram of an example implementation of a distribution operating system (OS) 120 in accordance with an example of the present technology. Operating systems produce an abstraction layer over hardware to give applications access to services implemented in that hardware, such as compute, storage and I/O (Input/Output). Existing operating systems utilize the hardware upon which the operating system is executing for the operating system's own hardware services that are offered to applications executing on top of the operating system. However, a distribution operating system 120 according to the present technology may be an operating system configured to manage hardware services 135-150 or computing resources remotely located from applications executing on the distribution operating system while using local resources (e.g., hardware 125 on local device 110) that are not made available to the applications executing on the distribution operating system 120 for the distribution operation system's own execution. In one sense, the distribution operating system 120 may be a local operating system for managing remote hardware and offering remote hardware services to applications executing on the distribution operating system.

FIG. 1A illustrates a local device 110 with computing resources or hardware 125, such as processors, memory, storage devices, networking equipment, I/O devices (e.g., keyboard, mouse, touch screen, display), and so forth. A host operating system (OS) 115 or base operating system may manage the computer resources or hardware 125 and provide common services for computer programs or applications. The host operating system 115 may, for example, be a time-sharing operating system that schedules tasks for efficient use of the system and for allocation of processor time, storage, printing, and other resources. For hardware functions such as I/O and memory allocation, the host operating system 115 may act as an intermediary between the applications and the computer hardware 125, although the application code may be executed directly by the hardware 125 and the applications may make a system call to an operating system function.

FIG. 1A further illustrates a distribution operating system 120 executing on the host operating system 115. For example, the distribution operating system 120 may execute similarly as other applications that may execute on the host operating system 115 and the distribution operating system 120 may receive a time slice of hardware processing as allocated by the host OS 115. For example, the host operating system 115 may act as an intermediary between the distribution operating system 120 and the hardware 125, or the host operating system 115 may provide access to the hardware 125 by the distribution operating system 120. Thus, the distribution operating system 120 may execute on the host operating system 115 similarly as other applications. However, I/O for the distribution operating system 120 may be through independent and remote hardware. Because the distribution operating system manages distributed or remote hardware, the distribution operating system may be a hardware distribution operating system.

The distribution operating system 120 may be include a kernel that executes on the host OS 115 like an application. However, the distribution operating system 120 may differ in various ways from typical applications. Specifically, the distribution operating system 120 is an operating system that offers hardware resources or hardware services. These hardware resources can be provided through system calls. For example, system calls in the distribution operating system 120 can be handled by a networked device driver. As with the host operating system 115, the distribution operating system 120 may manage computer resources or hardware, albeit remotely, and provide hardware services for computer programs or applications that execute on the distribution operating system 120.

The distribution operating system 120 may schedule tasks for allocation of processor time, storage, networking, I/O, printing, and so forth. The distribution operating system 120 may be similar in many regards to the host operating system 115, with some differences being that the distribution operating system 120 may execute on top of another operating system (i.e., the host operating system 115) and the distribution operating system 120 manages networked computing resources (i.e., services 130-150) while the host operating system 115 executes on hardware 125 or local computing resources and manages the local computing resources. The distribution operating system 120 may differ from virtual computing environments in which the operating system and hardware is entirely local and the distribution operating system 120 may differ from remote desktop connections in which the operating system and hardware is remote from a user and is accessed with an interface application on a local operating system executing on local hardware. As used herein, "remote" may refer to a geographical or physical separation as well as that a device may be accessible via a network.

The distribution operating system 120 may execute applications using a kernel and kernel functions similarly as with the execution of applications using a kernel of the host operating system 115. However, the applications executed on the distribution operating system 120 may not be granted any access to local computing resources (e.g., local hardware resources) but rather may be granted access to networked computing resources. In other words, the applications executing on the distribution operating system 120 may be granted access to different computing resources than the distribution operating system 120 uses for executing the kernel and receiving system calls. Binaries of the applications may be loaded from locally stored executable images. Alternatively, the applications may be loaded from executable images stored in a storage service that is accessible through a network. The applications may be executed locally using networked computing resources.

An application may be software or a computer program, such as may be designed to help a person perform an activity. An application may manipulate text, numbers, graphics, etc. Some application packages offer focused computing functions by focusing on a single task, such as word processing. Other application packages, such as integrated software packages, may offer less focus but may include multiple applications to perform multiple tasks. User-written software applications tailor systems to meet a user's specific needs. User-written software may include custom numerical processing, internet services, web servers, scientific simulations, graphics rendering and animation processes, email filters and so forth. The applications executable on the distribution operating system 120 may be any suitable type or form or application as may be appreciated.

Applications executed in remote computing instances, using remote desktop connections and the like may be executed remotely and a user interface, such as a graphical user interface (GUI), of the remotely executing application may be streamed to a local user. In contrast to a completely remote application or operating system, the present technology may enable the streaming of memory, processor (e.g., CPU (central processing unit)), timing, file system and other aspects of computing resources. The user interface may also be streamed.

The distribution operating system 120 may have access to or be associated with a service provider environment 130 for providing network-based services 130-150 or computing resources. These computing resources provide access to a hardware substrate that is underlying the computing resources. FIG. 1A illustrates some example networked computing resources, such as a compute service 130, a storage service 140, a networking service 145 and an I/O service 150. The networked computing resources may include virtual computing services. For example, a computing instance may be executing on a hypervisor, which in turn executes on a hardware substrate that is server hardware. The distribution operating system 120 may create, launch, and terminate virtual computing resources as desired. The distribution operating system 120 may have some control over the geographical location of virtual computing resources or clusters of computing resources to optimize latency and provide high levels of redundancy. The distribution operating system 120 may access and manage the one or more networked computing resources (i.e., remote resources) over a network connection (e.g., network 155), such as a connection through the Internet, for example.

As used herein "virtual computing" may refer to the use of computing resources (hardware and/or software) which may be available at a remote location from the users of the computing resources and the virtual computing resources may be accessible over a network, such as the Internet. Users may be able to buy these computing resources (including storage, computing power, networking and applications) as a utility on demand and sometimes by the hour. Use of virtual computing resources can provide a number of advantages including cost advantages and/or the ability to adapt rapidly to changing computing resource needs.

The service provider environment 130 may be capable of delivery of computing and storage capacity, as well as other computing services, as a service to a community of end recipients. In an example implementation, the service provider environment 130 may be established for an organization (i.e., a "customer") by or on behalf of the organization. That is, the service provider may offer a "virtual private cloud environment." In another implementation, the service provider environment 130 may support a multi-tenant environment, wherein a plurality of customers may operate independently (i.e., a public cloud environment). Generally speaking, the service provider environment may provide the following models: Infrastructure as a Service ("IaaS"), Platform as a Service ("PaaS"), and/or Software as a Service ("SaaS"). Other models may also be provided. For the IaaS model, the service provider environment may offer computers as physical or virtual machines and other resources. The PaaS model may deliver a computing platform that can include an operating system, programming language execution environment, database, and web server. Application developers may develop and run software solutions in the service provider environment without the cost of buying and managing the underlying hardware and software. The SaaS model allows installation and operation of application software in the service provider environment. In some implementations, end users may access the service provider environment using networked client devices, such as desktop computers, laptops, tablets, smartphones, etc. running web browsers or other lightweight client applications.

In one example, a service provider environment 130 may include any number of server computers for a compute service 135. The server computers may provide computing resources for executing software or computing instances, which may also be referred to as virtual machines. A virtual machine may generally be an instance of a software implementation of a machine (i.e. a computer) that executes computer code like a physical machine. However, as noted above, execution of the applications of the present technology differs from existing virtual machines and applications executing thereon. Specifically, the applications in existing operating system technology are loaded, stored and executed locally rather than on remote computing instances. Instead of using a remote operating system for computing needs, the present technology utilizes a local distribution operating system that manages the computing instance and other hardware services.

FIG. 1A illustrates distribution agents 160a-160d located at the compute service 135, storage service 140, networking service 145 and I/O service 150 in the service provider environment 130. The distribution operating system 120 may have hardware interface portions of the distribution operating system 120 that are distributed to the networked computing resources. The distribution agents 160a-160d may be the hardware management portion of the distribution operating system 120 that is distributed across the network 155 from the local device 110 to the computing resources in the service provider environment 130. The kernel for the distribution OS 120 and core OS functions are not distributed to the computing resources. In some sense, an analogy between the distribution agents and a device driver may be drawn because once a system call is made, then the appropriate data and instructions may be passed from the device driver in the distribution OS 120 to the distribution agent 160a-d. The distribution OS 120 can then take the appropriate action to access the service as discussed later.

Because the networked computing resources may be used in the absence of a remote operating system at those networked computing resources the distribution agent 160a-160d may facilitate the use of the networked computing resources. This configuration is contrary to existing remote physical or remote computing instances that have an operating system installed with the computing instance or other hardware that is being accessed.

The distribution agent 160a-160d may be a part of the kernel of the distribution operating system 120. The kernel of the distribution operating system 120 may thus be a distribution kernel for accessing distributed hardware service and the kernel of the distribution operating system 120 is a distributed kernel with portion of the kernel distributed to the services providing hardware access. For the compute service 135 to communicate with the kernel of the distribution OS, the distribution agent 160a-160d may run on the remote hardware and enable receipt of the application's assembly language (including the executable's header information, relative address information, etc.) over the network for executing on a processor (e.g., at the compute service). Specifically, the distribution agent 160a-160d may receive the executable machine language for the application from the kernel executing on the distribution operating system 120.

In existing OS architectures' the kernel identifies the next application or process from the executing process queue (not blocked, sleeping, etc.) that will receive processor time and then the kernel switches the context to the current process. By comparison, the distribution OS 120 may send the portion of the application or processes machine language instructions over to the distribution agent 160a. The distribution agent 160a may also keep track of multiple application contexts. When the distribution OS 120 sends the signal to change contexts, then executable code can be sent from a second application or process for execution.

In an alternative configuration, a distribution agent 160a may be set up for each application or process that is executing on the kernel of the distribution OS. Thus, the executable machine code for each application may be sent to separate computing instances in the compute service 135.

The distribution agent 160a may then cause the machine language code to be executed using the computing resources of the compute service 135 in the service provider environment 130, and provide results from the processor registers or the like back to the application at the local device 110. For example, an application may be compiled for the distribution operating system 120. The application may request memory and processor resources. The distribution operating system 120 may launch a computing instance and requests processor cycles. In addition, a chunk of memory may be requested from a storage service 140. The distribution operating system 120 may provide the distribution agent 160a to the computing instance to run to accommodate the request by the application for the processor resources and to report back to distribution kernel. The kernel may manage what executable information is sent to the distribution agent 160a. The distribution agent 160a-160d may be dynamically loaded, uploaded, replicated, etc. to facilitate usage of the networked computing resources. The application executing on the distribution operating system 120 may be programmed in the same fashion as any other local application executing on a local operating system to use local computing resources and the application may not be "aware" that networked computing resources are being used. Rather, the application may have the application code, make requests for processing time, make network calls and so forth the same as any other application. The application may not make API calls to launch virtual computing instances or the like because these API calls may be managed by the distribution operating system 120.

Data for the application can be stored on the storage service 140. The distribution agent 160b associated with the storage service 140 may be configured to store data on the storage data as though the data were arranged in a hardware memory scheme or virtual memory scheme. As the application is executing on the compute service 135, the application will request data. The appropriate data can be retrieved from the storage service 140 and then shipped to the compute service (either directly from service to service) or indirectly through the distribution operating system 120. The executable in compute service 135 can then operate on the data received and then return the transformed data to the storage service 140 for storing in the application's memory space.

This method can also be followed with the networking service 145 and the I/O service. The application can send data to the networking service 145 through the distribution agent 160c. The network hardware (e.g., a stand-alone networking card or a networking card associated with a computing instance) can then be accessed by the distribution agent 160c to communicate with other nodes on the external network (e.g., the internet). Then data that is received from nodes on the external network can be passed back to the distribution OS 120 and sent to the compute service 135 where the application's executable is running or to the storage service 140 where the data may be stored for later use. The I/O service 150 may be similarly accessed where the application sends data for output to the I/O service 150 (stand-alone I/O hardware or I/O hardware with a computing instance) or receives data from input devices that can be passed back to application through the distribution OS.

Figure 1B:
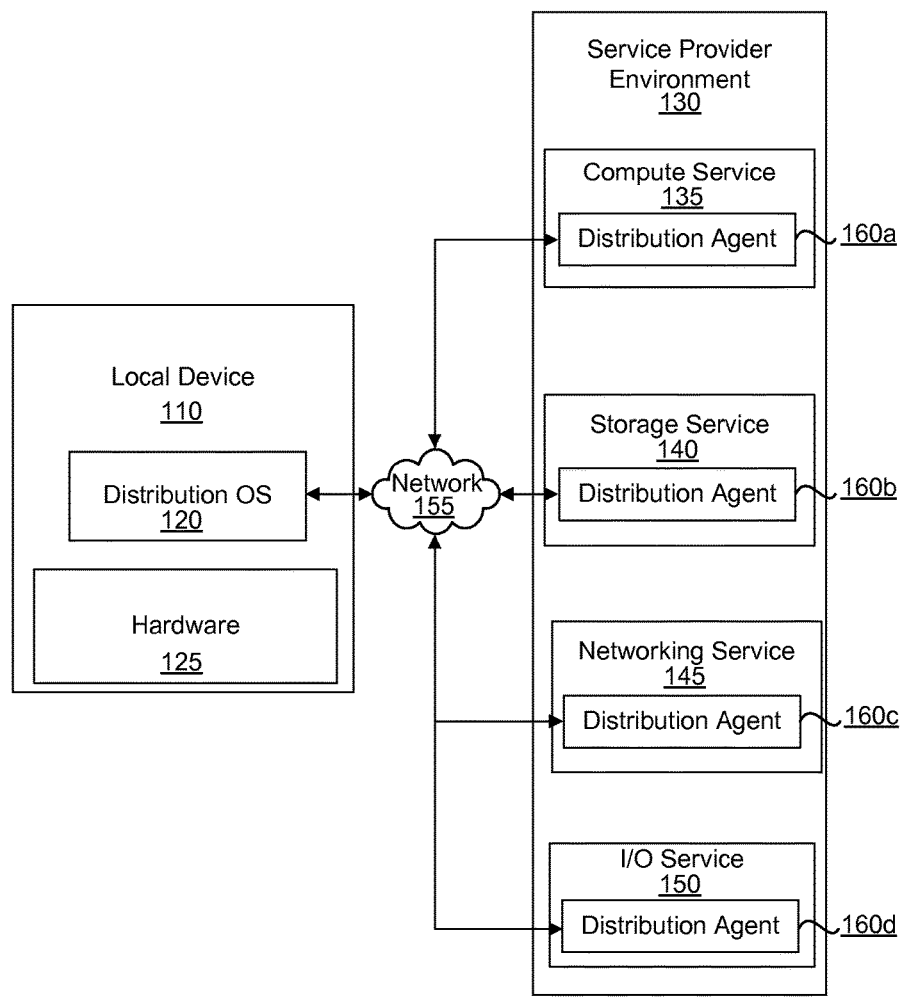

In FIG. 1B, an alternative implementation of a distribution operating system 120 is illustrated in accordance with an example. The operating system running on the local device 110 may be the distribution operating system 120. As contrasted to FIG. 1A in which the distribution operating system 120 executes on a host operating system, the distribution operating system of FIG. 1B may execute on the local device without the underlying host operating system. The distribution operating system may thus be configured to manage both local hardware and remote hardware services, using the local hardware for the distribution operating system and the remote hardware for the application(s) to be executed by the distribution operating system.

It should be appreciated that although the implementations disclosed herein are described primarily in the context of computing instances or virtual machines, other types of instances can be utilized with the concepts and technologies disclosed herein. For instance, the technologies disclosed herein can be utilized directly with physical hardware storage resources or virtual storage resources, hardware data communications (i.e., networking) resources, I/O hardware and with other types of computing resources. The implementations disclosed herein might also execute all or a portion of an application directly on a remote computer system without utilizing computing instances or an operating system on the remote hardware device or server.

Figure 2:
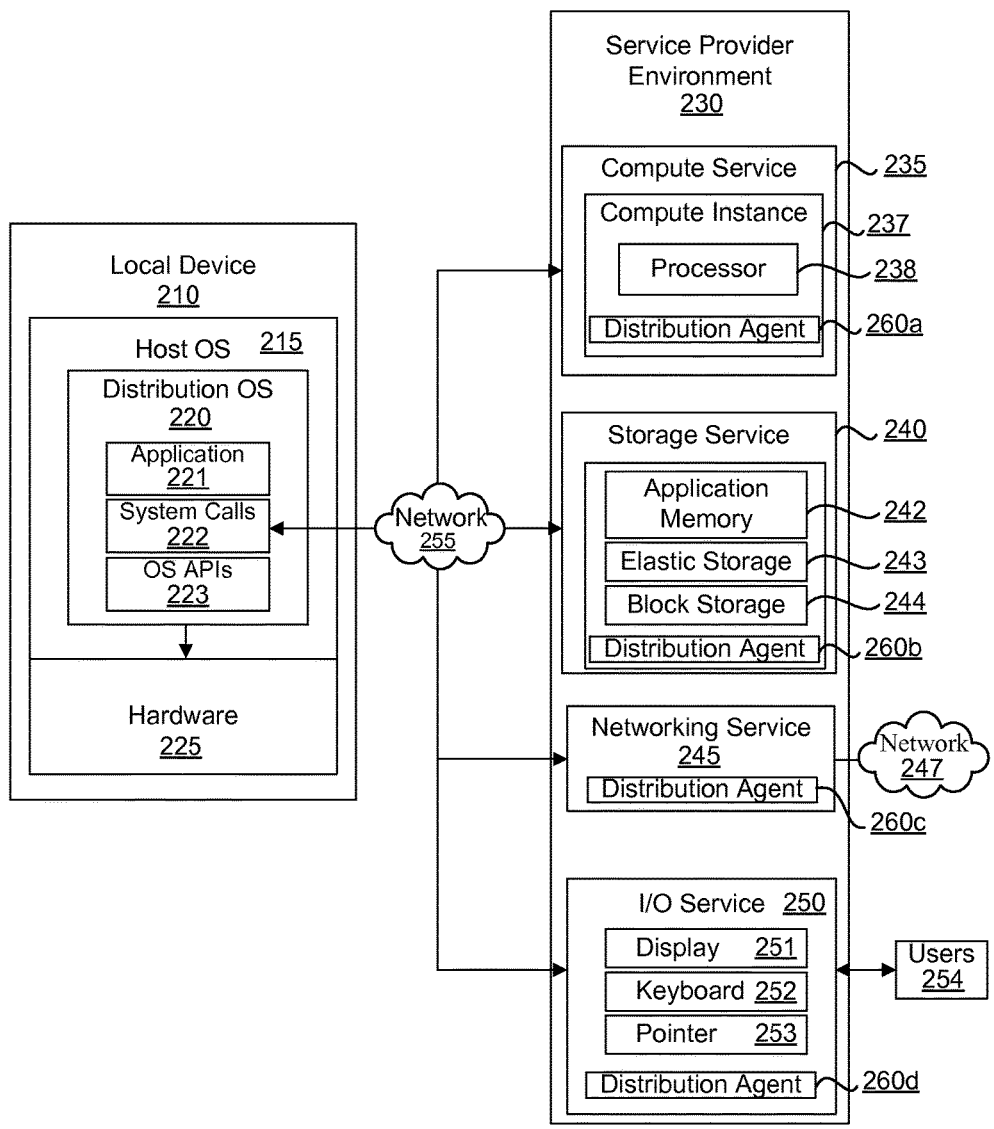
FIG. 2 is a block diagram of an implementation of a distribution operating system including distribution agents in accordance with an example of the present technology.

Referring to FIG. 2, a block diagram of an example implementation of a distribution operating system 220 is illustrated in accordance with an example of the present technology. Similarly as described with respect to FIG. 1A, FIG. 2 illustrates a plurality of operating systems 215, 220 operating locally on hardware 225 of a local device 210, one on top of another, where one of the operating systems (i.e., the host operating system 215) manages the hardware 225 of the local device 210 and another one of the operating systems (i.e., the distribution operating system 220) manages networked computing resources over a network 255.

The distribution operating system 220 may run as an application on the local device. Applications 221 may be compiled for the distribution operating system 220 so as not to communicate with the host operating system 215. In other words, when an application 221 is executed on the distribution operating system 220, requests for hardware services made to this distribution operating system 220 by the application 221 may be fulfilled by remote or networked computing resources (e.g., compute service 235, storage service 240, networking service 245, I/O 250). In one example, requests for hardware services made to the distribution operating system 220 by the application 221 may be fulfilled without using any local computing resources. The local distribution operating system 220 running as an application may execute locally and when an application 221 requests computing resources, for instance, the executable instructions or machine language code may be transmitted to the networked computing resources. As a specific example, the distribution operating system 220 may pull executable segments out of the applications 221 binary file and pass these executable segments to the networked computing resources.

The present technology may be used to create an operating system that runs on a local device 210, but utilizes computing resources remotely for applications executing on the distribution operating system 220, such as computing resources in a service provider environment 230. The present technology may have a variety of applications in testing, prototyping, and production scenarios. For example, a user may write the distribution operating system 220 locally with a configuration to manage and utilize distributed computing resources, compile the distribution operating system locally as a standard library, develop and/or boot applications onto the distribution operating system locally and so forth, but the applications would use distributed resources for execution. In this example, the technology may enable a first stage in creating an application that may eventually run in a distribution operating system that is executing on a computing instance located in a service provider environment 230. Users may run computing instances locally and then build applications against the local distribution operating system kernel, where the distribution operating system 220 is configured to use local resources. Applications may be written, compiled and tested on a local network and/or using local computing resources to reduce demand for remote resources to test application software, which the user may pay for.

The ability to rent, lease, or otherwise pay for access to networked computing resources may allow users to test applications that may eventually be executed on remote resources without the burden of providing and maintaining local hardware computing resources for processing, storage and the like. The present technology may enable reduced dependency on these networked computing resources, however, as well as reduced cost, because some aspects of development, testing and the like may be performed locally without the use of the networked computing resources.

Historically, users of computing resources have generally utilized local computing resources, that is, resources locally managed on or in connection with user devices, such as notebook and/or desktop computers. Common applications, such as word processing applications, for example, often execute locally on a user's computer, such as a work or home computer. As such, users (or organizations associated with the users) often pay for expensive hardware for executing the applications as well as for the maintenance and upgrade of the hardware. The present technology may address these issues by reducing dependence of the applications on the local hardware by managing remote hardware available through a service provider environment for execution of the applications.

The distribution operating system kernel, with the aid of the device drivers (for the networked computing resources) and distribution agents, may provide control over the networked computing resources. The distribution operating system kernel may manage memory access for applications in remote RAM (Random Access Memory), determine which applications get access to which networked computing resources when multiple applications are executing on the distribution operating system, setup or reset remote central processing unit (CPU) operating states, organize data for long-term non-volatile storage with file systems and so forth.

FIG. 2 illustrates example networked computing resources, including a compute service 235, a storage service 240, a networking service 245 and I/O service 250. The compute service 235 may provide compute instances 237, that may include one or more processors 238 and upon which the distribution agent 260a may be loaded. A distribution agent 260b-260d may be similarly loaded onto the storage service 240, networking service 245 and I/O services 250. The storage service 240 may provide application memory 242, elastic storage 243, block storage 244 and the like. The networking service 245 may provide access to a network 247, which may be the internet, a local area network (LAN), wide area network (WAN), metropolitan area network (MAN), storage area network (SAN), personal area network (PAN), global area network (GAN), controller area network (CAN), wireless local area network (WLAN), internetwork, or any other type of network. The I/O service 250 may provide access to a display 251, keyboard 252, pointer 253, touch pad, touch screen, video camera, or other I/O functionality to users 254 interacting with the application 221.

The compute service 235 may provide processing for the application 221 using the processor 238. Specifically, and by way of example, the distribution operating system 220 or the distribution agent 260a may cause the creation of a process, including assigning memory space and other resources, establishing a priority for the process in a multi-tasking scenario, loading application binary code into memory and so forth. The distribution operating system 220 may be responsible for deciding at any time which processor resources to allocate to the application(s) 221.

Among other things, the distribution operating system 220 may be responsible for managing system and/or application memory 242 currently in use. The distribution operating system 220 may select what memory the application may use at any given time. The distribution operating system may allocate an amount of memory to be available and may cause memory which is less frequently accessed to be stored in elastic or block storage components. The application memory 242 may be used to store both application instructions and data.

In addition to application memory 242, the storage service 240 may provide data storage, such as elastic storage 243 or block storage 244. Access to stored data by the processor 238, the application 221, or the distribution operating system 220 may thus be a feature of the distribution operating system 220. Data may be stored using files structured to allow for fast access, high reliability, and to make efficient use of the available storage space. The data may be stored as files in a file system, where the files may have names and attributes, and where files may be stored in a hierarchy of directories or folders arranged in a directory tree.

The data may be stored in a data store in the elastic or block storage components. The term "data store" may refer to any device or combination of devices capable of storing, accessing, organizing, and/or retrieving data, which may include any combination and number of data servers, relational databases, object oriented databases, simple web storage systems, cloud storage systems, data storage devices, data warehouses, flat files, and data storage configuration in any centralized, distributed, or clustered environment. The storage system components of the data store may include storage systems such as a SAN (Storage Area Network), cloud storage network, volatile or non-volatile RAM, optical media, or hard-drive type media.

A networked storage device at the storage service 240 may be accessed by the distribution operating system 220 through an API and/or through the distribution agent 260b, which may include or use a device driver or file system driver on the distribution operating system 220 side. A file system driver may translate the commands used to access each specific file system into a standard set of commands that the distribution operating system uses to "talk" to the file system(s) at the network storage service 245. The file system may enable the application to create, delete, open, and close files, as well as gather various information about the files.

The distribution agents 260a-260d in FIG. 2 may interface with or use a device driver on the distribution operating system 220 side to allow interaction of the application with the hardware services via the distributions agents 260a-260d. The distribution agents 260a-d may be used as an interface for communicating with the computing service and underlying hardware device(s) by providing commands to and/or receiving data from the computing service and device (s). On the other end, the device driver(s) can provide the hardware interfaces to the operating system and software applications. In one example, the device driver may be on the local hardware and may be a remote driver (that is local) for use in communicating with the distribution agents 260a-260d that interface with the remote computing services and hardware.

The networking service 245 may provide networking capabilities to the application 221 executing on the distribution operating system 220. The networking service 245 may allow the distribution operating system 220 or the application 221 executing thereon to access the resources of a remote computer to support the functions as if those resources were connected directly to the local computer.

The I/O service 250 may provide devices or functionality for underlying hardware devices including, by way of example and without limitation, a keyboard 252, a mouse or pointer 253, sound hardware, computer graphics cards, a frame buffer, printers, displays 251, network adapters, etc. The distribution operating system kernel may receive requests from the application to perform I/O to an appropriate device (or subsection of a device, in the case of windows on a display) and enable use of the device by users 254. Users 254 may interact with the application through the I/O using client devices. For example, the client devices may access data, content pages, services and so forth via the service provider environment or one or more computing instances or clusters, over the network. Example client devices may include, but are not limited to, a desktop computer, a laptop, a tablet, a mobile device, a television, a cell phone, a smart phone, a hand held messaging device, a personal data assistant, an electronic book reader, heads up display (HUD) glasses, or any device with a display that may receive and present the message content.

Operating system kernels typically include a scheduler to determine how much time each application may spend executing, and in which order execution control is passed to applications (i.e., processes). The kernel may pass control of a processor or other hardware resource to a process or application, which allows the application access to the CPU, memory, etc. Control is later returned to the kernel in a context switch to allow another application or process to use the CPU. Scheduling or time slicing may determine which processes are allowed to use the application at what times and for how long. Also, due to software, hardware and electrical limitations, operating systems or applications executing thereon may be limited in memory, CPU or other computing resource usage, such as to enhance stability of the software or operating system, to enable context switching and other features.

However, contrary to previous systems where any number of applications or processes may share resources, resulting in time slicing or the like, or resulting in utilizing less than all of available resources to ensure stability and the like, the networked computing resources may be more fully utilized according to the present technology. For example, because the distribution operating system utilizes separate hardware from what is utilized by the application, the distribution operating system may allow the application to utilize up to 100% of the networked computing resources without reservation or negatively impacting the performance of the distribution operating system. Additionally, because the distribution operating system utilizes different or separate computing resources (i.e., local hardware) than the application utilizes, any faults, errors, hardware failures, crashes and the like occurring for the application will occur at the remote resources and not negatively affect the distribution operating system. In the event of a crash or other issue, the networked computing resources may be shut down, restarted, refreshed or otherwise managed without interruption of operation of the distribution operating system. In other words, lack of stability of the application on the distribution operating system does not result in a lack of stability of the overall distribution operating system.

The distribution operating system may enable system calls 222 or kernel calls. The system call may represent a request from the application for a service from the distribution operating system's kernel that the application does not have permission to run. Once the distribution operating system has granted permission to the application to run a service or otherwise access the networked computing resources, the application may access the resources directly without first performing a system call. The system calls may thus provide an interface between a process of the application and the operating system. Applications interacting with hardware may generally request permissions, such as for I/O performed with a device, or communication with other processes and so forth using system calls.

The system calls may use machine-code instructions that cause the processor to change modes, such as from a supervisor mode to a protected mode where the operating system performs actions such as accessing hardware devices or the memory management unit. Generally the distribution operating system may provide a library, as mentioned previously, between the distribution operating system and the application to handle low-level details of passing information to the kernel and switching modes. System calls include close, open, read, wait and write.

The distribution operating system may also use OS APIs 223. An API may be a set of commands, functions, and/or protocols which allows the use of predefined functions to interact with higher level services of the operating system that are not system calls. The distribution operating system may use OS APIs 223 to provide additional services to the application such as object modeling, interprocess communications, garbage collection and other services.

The system of FIG. 2 may be implemented across one or more computing devices, which may be connected via a local network. For example, the local device 210 may host various engines and/or modules as part of the distribution operating system and such modules may be executable by a processor of the local device. The local device 210 may be implemented as a plurality of computing nodes, each of which comprises at least one processor and a memory, where the computing nodes are configured to collectively implement the modules, data stores and so forth.

The local device 210 may comprise, for example, a server computer or any other system providing computing capability. Alternatively, a plurality of computing devices may be employed that are arranged, for example, in one or more server banks, blade servers or other arrangements. For example, a plurality of computing devices together may comprise a clustered computing resource, a grid computing resource, and/or any other distributed computing arrangement. Such computing devices may be located in a single installation or may be distributed among many different geographical locations. For purposes of convenience, the computing device is referred to herein in the singular form. Even though the computing device is referred to in the singular form, however, it is understood that a plurality of computing devices may be employed in the various arrangements described above.

Various applications and/or other functionality may be executed in the local device 210 or networked computing resources according to various implementations. Also, various data may be stored in a data store that is accessible to the local device or networked computing resources. The data store may be representative of a plurality of data stores as may be appreciated. The data stored in the data store, for example, may be associated with the operation of the various applications and/or functional entities described. The components executed on the local device or networked computing resources may include any of a variety of applications, services, processes, systems, engines or functionality not discussed in detail herein.

Services 235, 240, 245, 250, as provided through the service provider environment 230, may represent one or more processes executing on a server or other computer hardware. Such services may be centrally hosted functionality or a service application that may receive requests and provide output to other services or devices. For example, services may be considered on-demand computing that is hosted in a server, virtualized environment, grid or cluster computing system.

Figure 3:
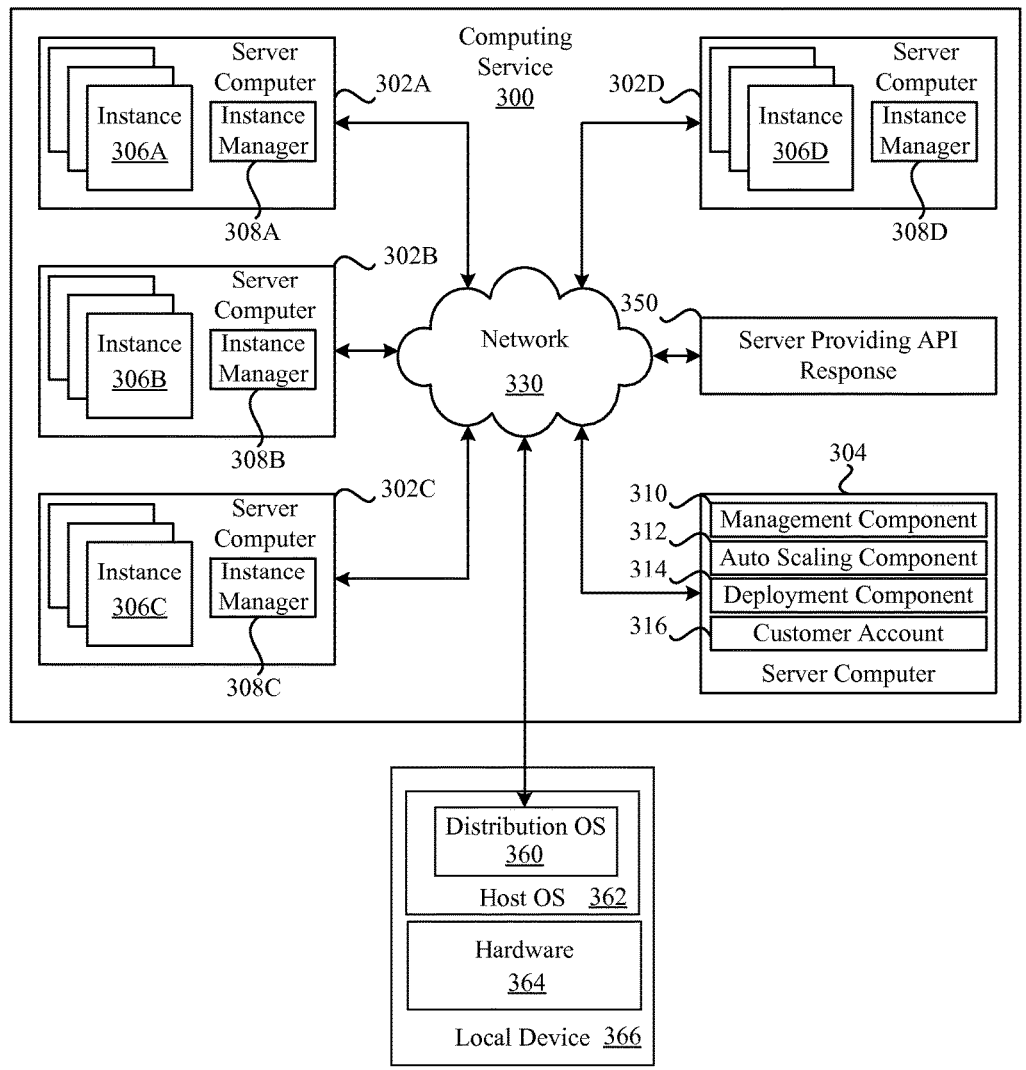
FIG. 3 is a schematic overview of a virtual computing resource provider in combination with a distribution operating system in accordance with an example of the present technology.

FIG. 3 illustrates how networked computing resources may function in a computing service 300 or a service provider environment (230 in FIG. 2). Whereas discussion relating to FIGS. 1-2 focused primarily on the distribution operating system 360 operating on the host operating system 362 operating on hardware 364 of a local device 366, discussion of FIG. 3 may relate more to the computing service 300 or service provider environment providing the remote or networked computing resources to be managed by the distribution operating system.

As discussed earlier, the computing service 300 (i.e., the cloud provider or service provider) may be capable of delivery of computing and storage capacity as a service to a community of end recipients. In an example implementation, the computing service may be established for an organization by or on behalf of the organization. That is, the computing service 300 may offer a "private cloud environment." In another implementation, the computing service 300 may support a multi-tenant environment, wherein a plurality of customers operate independently (i.e., a public cloud environment). Generally speaking, the computing service 300 can provide the following models: Infrastructure as a Service ("IaaS"), Platform as a Service ("PaaS"), and/or Software as a Service ("SaaS"). Other models may also be provided. In some implementations, end users access the computing service 300 using networked client devices, such as desktop computers, laptops, tablets, smartphones, etc. running web browsers or other lightweight client applications. Those skilled in the art will recognize that the computing service 300 can be described as a "cloud" environment.

The particularly illustrated computing service 300 may include a plurality of server computers 302A-302D. While four server computers are shown, any number may be used, and large centers may include thousands of server computers. The server computers 302A-302D may provide computing resources for executing computing instances or software instances 306A-306D. In one implementation, the instances 306A-306D may be virtual machines. A virtual machine may be an instance of a software implementation of a machine (i.e. a computer) that executes applications like a physical machine. In the example of a virtual machine, each of the servers 302A-302D may be configured to execute an instance manager 308A-308D capable of executing the instances. The instance manager 308A-308D may be a hypervisor or another type of program configured to enable the execution of multiple instances 306A-306D on a single server. Additionally, each of the instances 306 may be configured to execute one or more applications.

It should be appreciated that although the implementations disclosed herein are described primarily in the context of virtual machines, other types of instances can be utilized with the concepts and technologies disclosed herein. For instance, the technologies disclosed herein can be utilized with storage resources, data communications resources, and with other types of computing resources. The implementations disclosed herein might also execute all or a portion of an application directly on a computer system without utilizing virtual machine instances.

One or more server computers 304 may be reserved for executing software components for managing the operation of the server computers 302A-D and the instances 306A-D. For example, the server computer 304 may execute a management component 310. A customer may access the management component 310 to configure various aspects of the operation of the instances 306 purchased by the customer (i.e., the administrator of a service to be executed using the instances and made available to traffic from client devices). For example, the customer may purchase, rent or lease instances and make changes to the configuration of the instances. The customer may also specify settings regarding how the purchased instances are to be scaled in response to demand. An auto scaling component 312 may scale the instances 306 based upon rules defined by the customer. In one implementation, the auto scaling component 312 may allow a customer to specify scale-up policies for use in determining when new instances should be instantiated and scale-down policies for use in determining when existing instances should be terminated. The auto scaling component 312 may consist of a number of subcomponents executing on different server computers 302 or other computing devices. The auto scaling component 312 may monitor available computing resources over an internal management network and modify resources available based on predictions of need as well as based on actual need.

A deployment component 314 may be used to assist customers in the deployment of new instances 306 of computing resources. The deployment component 314 may have access to account information associated with the instances, such as who is the owner of the account, credit card information, country of the owner, etc. The deployment component 314 may receive a configuration from a customer that includes data describing how new instances 306 should be configured. For example, the configuration may specify one or more applications to be installed in new instances 306, provide scripts and/or other types of code to be executed for configuring new instances 306, provide cache logic specifying how an application cache should be prepared, and other types of information. The deployment component 314 may utilize the customer-provided configuration and cache logic to configure, prime, and launch new instances 306. The configuration, cache logic, and other information may be specified by a customer using the management component 310 or by providing this information directly to the deployment component 314.

Customer account information 316 may include any desired information associated with a customer of the multi-tenant environment. For example, the customer account information can include a unique identifier for a customer, a customer address, billing information, licensing information, customization parameters for launching instances, scheduling information, auto-scaling parameters, previous IP (Internet Protocol) addresses used to access the account, etc. Information such as the unique identifier, IP addresses used to access the account and so forth may be used in authenticating a user to the service provider environment.

A network 330 may be utilized to interconnect the server computers 302A-302D and the server computer 304, 350. The network 330 may be a local area network (LAN) and may be connected to a Wide Area Network (WAN) so that end users may access the computing service 300. It should be appreciated that the network topology illustrated in FIG. 3 has been simplified and that many more networks and networking devices may be utilized to interconnect the various computing systems disclosed herein.

A server providing API response 350 may be a server for providing a response to an API request, such as to process the request, to grant the request, to deny the request and so forth.

Figure 4:
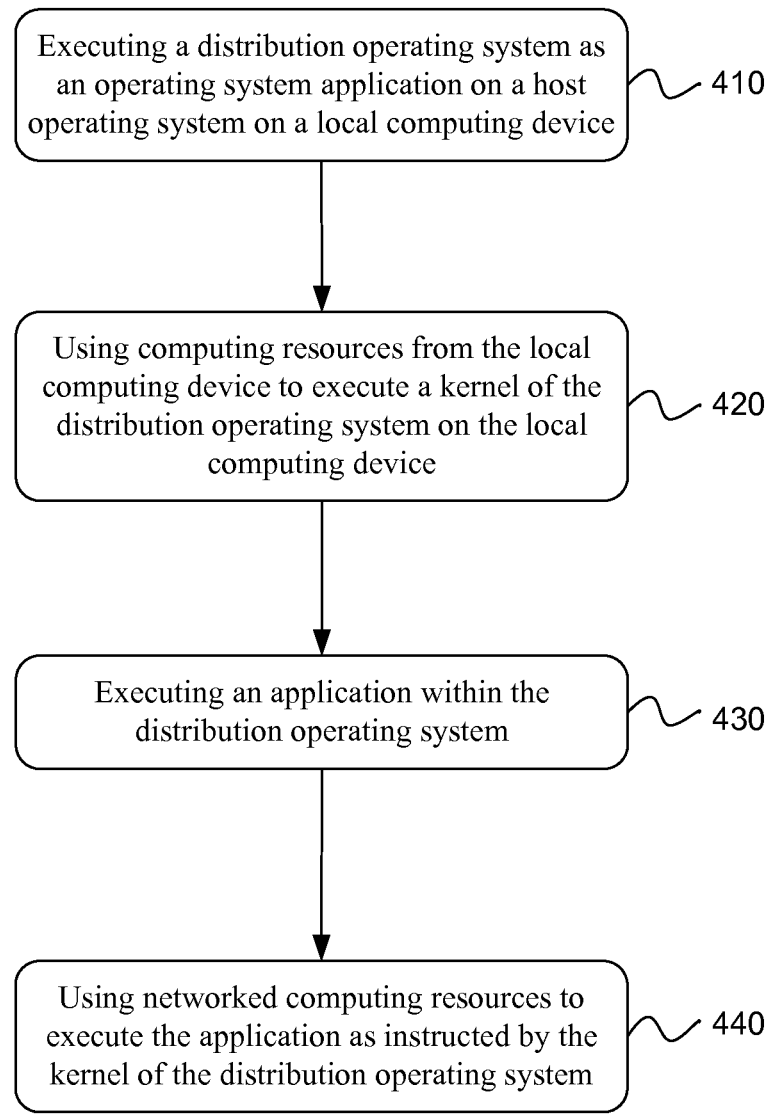
FIGS. 4-5 are flow diagrams for methods of implementing distribution operating systems in accordance with examples of the present technology.
Figure 5:
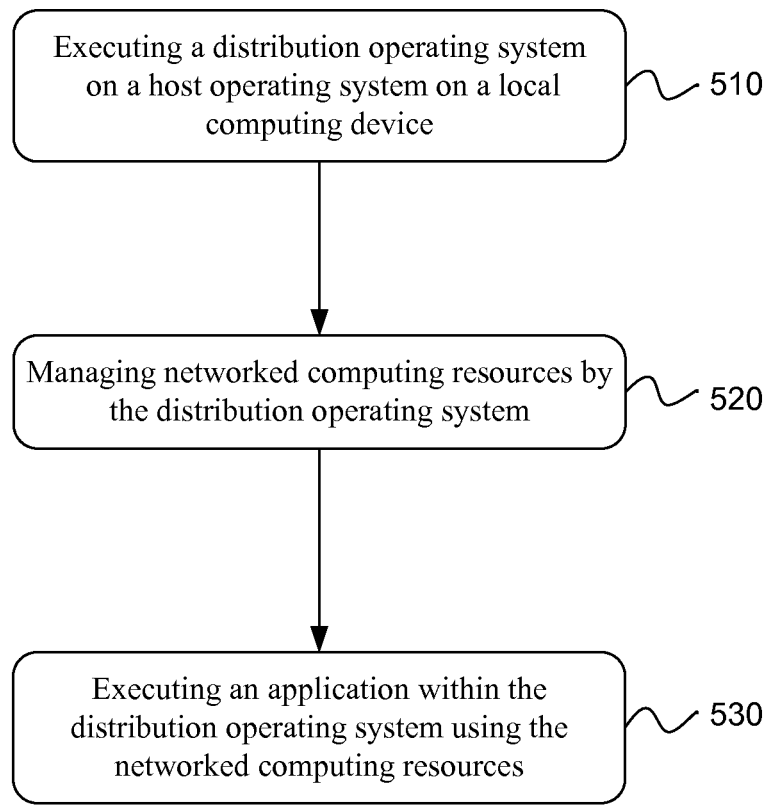

FIGS. 4-5 illustrate flow diagrams of methods according to the present technology. For simplicity of explanation, the methods are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term article of manufacture, as used herein, is intended to encompass a computer program accessible from any computer-readable device or storage media.

Any of a variety of other process implementations which would occur to one of ordinary skill in the art, including but not limited to variations or modifications to the process implementations described herein, are also considered to be within the scope of this disclosure.

Referring now to FIG. 4, a flow diagram of a method is illustrated for operating a distribution operating system in accordance with an example of the present technology. The method may include executing 410 a distribution operating system as an operating system application on a host operating system on a local computing device. Accordingly, the distribution operating system may be a kernel executing on a host operating system. Computing resources from the local computing device may be used 420 to execute the kernel of the distribution operating system on the local computing device. The distribution operating system may be configured to enable applications to be installed, developed or otherwise executed thereon. Thus, the method may include executing 430 an application within the distribution operating system where the hardware calls for the application are implemented remotely. In other words, rather than using the local computing resources, networked computing resources may be used 440 to execute the application as instructed by the kernel of the distribution operating system.

The method may include sending application processing requests to the networked computing resources and receiving processed data from the network computing resources in response to the application data processing requests. The application processing requests may be requests to access hardware functions, such as processing, storage, networking and I/O. For example, a distribution agent may be loaded at the networked computing resource to receive and initiate processing of the requests from the application via the distribution operating system and to return the processed data from the network computing resources back to the application. The method may include loading the distribution agent, which may in communication with the kernel of the distribution operating system, to the networked computing resources or computing services to perform computing instructions (i.e., the requests) received from the application or the distribution operating system. In one specific example, machine language code of an executable portion of a binary of the application may be passed for the application to the networked computing resources using the distribution operating system, where the binary of the application may be loaded or stored at the local computing device on a storage device or storage system. In an alternative configuration, the executable image or binary of the application may be stored on a storage service that is accessible to the distribution operating system, and when the application is executed on a computing instance by the initiation of the distribution operating system, then the executable image may be transferred from the storage service.

Additional example details, operations, options, variations, etc. that may be part of the method have been described previously herein and/or are described in further detail below. Various systems, devices, components, modules and so forth for implementing the method may also be used, as described with respect to the various examples included in this disclosure.

Referring now to FIG. 5, a flow diagram of a method is illustrated for operating a distribution operating system in accordance with another example of the present technology. The method may include executing 510 a distribution operating system on a local computing device and executing 530 an application within the distribution operating system using networked computing resources managed 520 by the distribution operating system.

The application and/or distribution operating system may communicate with the networked computing resources over a network connection, such as an internet connection. The distribution operating system and the host operating system may be separate and/or different types of operating systems from one another. A kernel of the distribution operating system may be remote from an execution environment and execution hardware for the application over a network. Rather, the application may be initiated or managed locally with processing and other computing resources used for executing the application being located remotely.

The networked computing resources or computing instances being used may include a plurality of different processing architectures, such as ARM, x64, x86, Intel and other architectures. The method may include performing a separate call for each application using a different processing architecture in the distribution operating system. A different computing instance may be selected for each processor type and the application(s) may be streamed to a matching computing instance. In other words, multiple applications using different architectures may execute on a same distribution operating system but using different processor hardware architectures. Specifically, the applications may be distributed to different computing instances that have dissimilar processor architectures.

In another example, a single application may be executed using a plurality of architectures, where different processes of the application may be better suited to different architectures and thus processed by the appropriate corresponding architecture at the networked computing resources as directed by the distribution operating system. In one example, the distribution operating system kernel may enable cross-architecture calls by the application to facilitate the use of multiple architectures by a single application.

In one example, a chipset of the distributed computing hardware may be different than a chipset of the local computing hardware. The application may thus be executed using a different chipset or architecture than a chipset or architecture used to execute the distribution operating system.

The method may include causing a portion of a kernel of the distribution operating system to be loaded at the networked computing resources to manage use of computing resources for the application at the networked computing resources. This portion of the kernel of the distribution operating system may be the distribution agent.

The method may include recovering from a crash of the application or recovering from a hardware failure of the networked computing resources by restarting the networked computing resources or computing services while continuing to operate the distribution operating system on the local computing device. In other words, a crash or other performance issue for the application may not impact performance of the distribution operating system due to the bifurcated hardware configuration enabled by the distribution operating system.

Also, computing resource usage by the application may not compete with the computing resource usage by the distribution operating system because the application and the distribution operating system use different or separate hardware resources. Because the distribution operating system is not sharing hardware resources with the application, the method may include enabling access to unrestricted or unlimited usage of the networked computing resources by the application. In other words, the distribution operating system may include eliminating or forgoing privileged memory or CPU usage with respect to the networked computing resources to increase performance and efficiency of the networked memory or CPU for the application. Privileged resources on the networked computing resources may be unnecessary because the networked computing resources may be dedicated completely to the application where the distribution operating system uses separate hardware. In one example, the system may forgo a virtual memory manager for the networked computing resources to allow the application to run unfettered by a virtual memory manager and any restrictions that may otherwise be imposed by the virtual memory manager. The method may provide separate and discrete pools of addressable memory space for the distribution operating system and the application. The method may also provide separate and discrete pools of addressable memory space for different processes or applications running on the distribution operating system to avoid competition for memory or other resources between applications.

The method may include operating the host operating system and the distribution operating system in the absence of a network connection to the networked computing resources. In other words, although the distribution operating system may manage the networked computing resources, the system may still work offline to enable development, testing and so forth of the distribution operating system or applications to be executed thereon.

The method may further include streaming data to use memory management, processing, networking and a file system associated with the application from the networked computing resources.

Similarly as mentioned in the description of the method illustrated in FIG. 4, additional example details, operations, options, variations, etc. that may be part of the method illustrated in FIG. 5 have been described previously herein and/or are described in further detail below. Various systems, devices, components, modules and so forth for implementing the method may also be used, as described with respect to the various examples included in this disclosure.

In some examples, this or other methods described herein may be implemented wholly or partially as computer readable program code executed by a processor and the computer readable code may be embodied on a non-transitory computer usable medium.

Figure 6:
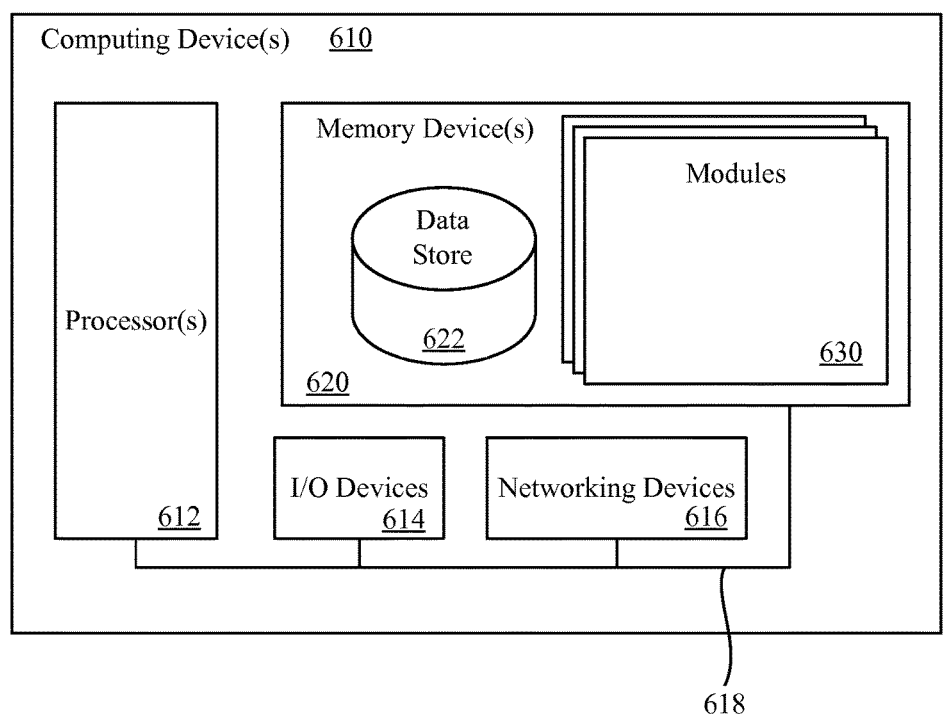
FIG. 6 is a block diagram of a computing system for implementing a distribution operating system in accordance with an example of the present technology.

FIG. 6 illustrates a computing device 610 on which services or modules of this technology may execute. A computing device 610 is illustrated on which a high level example of the technology may be executed. The computing device 610 may include one or more processors 612 that are in communication with memory devices 620. The computing device 610 may include a local communication interface 618 for the components in the computing device. For example, the local communication interface 618 may be a local data bus and/or any related address or control busses as may be desired.

The memory device 620 may contain modules 630 that are executable by the processor(s) and data for the modules. A data store 622 may also be located in the memory device 620 for storing data related to the modules and other applications along with an operating system that is executable by the processor(s) 612.

The computing device 610 may further include or be in communication with a client device, which may include a display device. The client device may be available for an administrator to use in interfacing with the computing device 610, such as to review operation of a virtual computing instance, make improvements to machine learning models and so forth.

Various applications may be stored in the memory device 620 and may be executable by the processor(s) 612. Components or modules discussed in this description that may be implemented in the form of software using high programming level languages that are compiled, interpreted or executed using a hybrid of the methods.

The computing device 610 may also have access to I/O (input/output) devices 614 that are usable by the computing devices. An example of an I/O device 614 is a display screen that is available to display output from the computing devices. Other known I/O device may be used with the computing device as desired. Networking devices 616 and similar communication devices may be included in the computing device 610. The networking devices 616 may be wired or wireless networking devices 616 that connect to the internet, a LAN, WAN, or other computing network.

The components or modules that are shown as being stored in the memory device 620 may be executed by the processor 612. The term "executable" may mean a program file that is in a form that may be executed by a processor 612. For example, a program in a higher level language may be compiled into machine code in a format that may be loaded into a random access portion of the memory device 620 and executed by the processor 612, or source code may be loaded by another executable program and interpreted to generate instructions in a random access portion of the memory to be executed by a processor 612. The executable program may be stored in any portion or component of the memory device 620. For example, the memory device 620 may be random access memory (RAM), read only memory (ROM), flash memory, a solid state drive, memory card, a hard drive, optical disk, floppy disk, magnetic tape, or any other memory components.

The processor 612 may represent multiple processors and the memory 620 may represent multiple memory units that operate in parallel to the processing circuits. This may provide parallel processing channels for the processes and data in the system. The local interface may be used as a network to facilitate communication between any of the multiple processors and multiple memories. The local interface may use additional systems designed for coordinating communication such as load balancing, bulk data transfer, and similar systems.

While the flowcharts presented for this technology may imply a specific order of execution, the order of execution may differ from what is illustrated. For example, the order of two more blocks may be rearranged relative to the order shown. Further, two or more blocks shown in succession may be executed in parallel or with partial parallelization. In some configurations, one or more blocks shown in the flow chart may be omitted or skipped. Any number of counters, state variables, warning semaphores, or messages might be added to the logical flow for purposes of enhanced utility, accounting, performance, measurement, troubleshooting or for similar reasons.

Functional units, services or the like may be implemented as a hardware circuit comprising custom VLSI circuits or gate arrays, off-the-shelf semiconductors such as logic chips, transistors, or other discrete components. Functional units, services or the like may also be implemented in programmable hardware devices such as field programmable gate arrays, programmable array logic, programmable logic devices or the like.

Functional units, services or the like may also be implemented in software for execution by various types of processors. An identified module of executable code may, for instance, comprise one or more blocks of computer instructions, which may be organized as an object, procedure, or function. Nevertheless, the executables need not be physically located together, but may comprise disparate instructions stored in different locations and achieve the stated purpose for the executables when joined logically together.

Executable code may be a single instruction, or many instructions, and may even be distributed over several different code segments, among different programs or applications, and across several memory devices. Similarly, operational data may be embodied in any suitable form and organized within any suitable type of data structure. The operational data may be collected as a single data set, or may be distributed over different locations including over different storage devices.

The technology described here may also be stored on a computer readable storage medium that includes volatile and non-volatile, removable and non-removable media implemented with any technology for the storage of information such as computer readable instructions, data structures, program modules, or other data. Computer readable storage media include, but is not limited to, RAM, ROM, EEPROM, flash memory or other memory technology, CD-ROM, digital versatile disks (DVD) or other optical storage, magnetic cassettes, magnetic tapes, magnetic disk storage or other magnetic storage devices, or any other computer storage medium which may be used to store the desired information and described technology. The computer readable storage medium may, for example, be in the form of a non-transitory computer readable storage medium. As used herein, the terms "medium" and "media" may be interchangeable with no intended distinction of singular or plural application unless otherwise explicitly stated. Thus, the terms "medium" and "media" may each connote singular and plural application.

The devices described herein may also contain communication connections or networking apparatus and networking connections that allow the devices to communicate with other devices. Communication connections are an example of communication media. Communication media typically embodies computer readable instructions, data structures, program modules and other data in a modulated data signal such as a carrier wave or other transport mechanism and includes any information delivery media. A "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared, and other wireless media. The term computer readable media as used herein includes communication media.

Reference was made to the examples illustrated in the drawings, and specific language was used herein to describe the same. It will nevertheless be understood that no limitation of the scope of the technology is thereby intended. Alterations and further modifications of the features illustrated herein, and additional applications of the examples as illustrated herein, which would occur to one skilled in the relevant art and having possession of this disclosure, are to be considered within the scope of the description.

Furthermore, the described features, structures, or characteristics may be combined in any suitable manner in one or more examples. In the preceding description, numerous specific details were provided, such as examples of various configurations to provide a thorough understanding of examples of the described technology. One skilled in the relevant art will recognize, however, that the technology may be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements may be devised without departing from the spirit and scope of the described technology.

The invention claimed is:

1. A computer implemented method, comprising:
   executing a hardware distribution operating system as an operating system application on a host operating system on a single local computing device;
   using computing resources from the single local computing device to execute a kernel of the hardware distribution operating system on the single local computing device;
   loading an application using the hardware distribution operating system; and
   using networked computing resources in a service provider environment to execute the application as instructed by the kernel of the hardware distribution operating system, the networked computing resources being remote and separate from the kernel and computing resources used to execute the kernel.

2. The method of claim 1, further comprising sending application processing requests to the networked computing resources and receiving processed data from the network computing resources in response to the application processing requests.

3. The method of claim 1, further comprising distributing a distribution agent of the hardware distribution operating system at the networked computing resources to perform computing instructions received from the application.

4. The method of claim 1, further comprising loading or storing a binary of the application at the single local computing device and passing an executable portion of the application to the networked computing resources.

5. A computer implemented method, comprising:
   executing a kernel of a distribution operating system on a host operating system on a local computing device, wherein the distribution operating system is a separate type of operating system than the host operating system;
   managing networked computing resources via distribution agents of the distribution operating system executing on the networked computing resources; and
   executing an application via the distribution agents of the distribution operating system using the networked computing resources in a service provider environment to perform hardware related functions for the application, the networked computing resources being remote and separate from the kernel and computing resources of the local computing device used to execute the kernel.

6. The method of claim 5, wherein the networked computing resources comprise a plurality of different processing architectures, the method further comprising performing a separate architecture call for different processes of the application.

7. The method of claim 6, further comprising performing cross-architecture calls between the different processes.

8. The method of claim 5, wherein the networked computing resources comprise a plurality of dissimilar processing architectures and the application comprises a plurality of applications each configured to utilize dissimilar processing architectures, the method further comprising performing a separate call for each of the plurality of applications using the distribution operating system.

9. The method of claim 5, further comprising causing a distribution agent configured to interface with a kernel of the distribution operating system and to be loaded at the networked computing resources to manage use of computing resources for the application at the networked computing resources.

10. The method of claim 5, further comprising recovering from a crash of the application or from a hardware failure of the networked computing resources by restarting the networked computing resources while continuing to operate the distribution operating system on the local computing device.

11. The method of claim 5, further comprising forgoing privileged memory or privileged processing on the networked computing resources and enabling access by the application to unrestricted usage of the networked computing resources.

12. The method of claim 5, further comprising operating the host operating system and the distribution operating system in the absence of a network connection to the networked computing resources.

13. The method of claim 5, further comprising communicating with the networked computing resources over an internet connection.

14. The method of claim 5, further comprising wherein the distribution operating system does not manage the local computing device.

15. The method of claim 5, wherein using networked computing resources comprises streaming data to use memory, processing, timing, networking and a file system associated with the application from the networked computing resources.

16. The method of claim 5, wherein a kernel of the distribution operating system is remote from the networked computing resources used to execute the application over a network.

17. A system, comprising:
local computing hardware;
a host operating system configured to manage and use the local computing hardware;
a distribution operating system configured to execute on the host operating system and the local computing hardware, wherein the host operating system manages the use of the local computing hardware for the distribution operating system; and
an application configured to be loaded by the distribution operating system and to execute using distributed computing hardware in a service provider environment, the distributed computing hardware being remote and separate from the local computing hardware and a kernel of the distribution operating system;
wherein the distribution operating system manages the distributed computing hardware and manages the use of the distributed computing hardware by the application.

18. The system of claim 17, wherein the distribution operating system maintains portions of the distribution operating system to interface with the distributed computing hardware to execute the application on the distributed computing hardware.

19. The system of claim 17, wherein the distributed computing hardware comprises a storage device, a processing device, I/O device or networking device.

20. The system of claim 17, wherein a chipset of the distributed computing hardware is dissimilar to a chipset of the local computing hardware.

* * * * *